US005149554A

United States Patent [19]

Abler

[11] Patent Number: 5,149,554

[45] Date of Patent: Sep. 22, 1992

[54] METHOD AND APPARATUS FOR TRANSFERRING FOOD MATERIAL SLICES

[75] Inventor: Norman C. Abler, Madison, Wis.

[73] Assignee: Oscar Mayer Foods Corporation, Madison, Wis.

[21] Appl. No.: 690,481

[22] Filed: Apr. 24, 1991

[51] Int. Cl.[5] .......................... A23L 1/00; B65B 35/00

[52] U.S. Cl. ...................................... 426/420; 53/244; 53/517; 198/462; 271/196; 426/129; 426/414

[58] Field of Search ............... 426/420, 129, 130, 410, 426/414; 53/517, 244, 591; 271/196, 900; 198/428, 462

[56] References Cited

U.S. PATENT DOCUMENTS

| | | | |
|---|---|---|---|
| 3,475,184 | 10/1969 | La Mers et al. | 426/420 |
| 3,481,746 | 12/1969 | La Mers et al. | 426/420 |
| 3,907,095 | 9/1975 | Russell et al. | 198/407 |
| 3,978,642 | 9/1976 | Smithers | 53/517 |
| 4,020,614 | 5/1977 | Smithers | 53/517 |
| 4,041,676 | 8/1977 | Smithers | 53/517 |
| 4,532,751 | 8/1985 | Mally et al. | 53/517 |

*Primary Examiner*—George Yeung
*Attorney, Agent, or Firm*—Lockwood, Alex, Fitzgibbon & Cummings

[57] ABSTRACT

An apparatus for transferring individual slices of material which are sliced from a material supply to a support web includes a rotating hollow drum disposed on and rotating around a stationary inner drum. The rotating outer drum is disposed proximate to a slicing station and material supply. The rotating drum and the stationary drum have hollow inner cores to which negative and positive air pressure is alternately applied to cause individual material slices to alternately adhere to the outer shell of the drum and to leave the outer shell of the drum.

35 Claims, 5 Drawing Sheets

METHOD AND APPARATUS FOR TRANSFERRING FOOD MATERIAL SLICES

BACKGROUND AND SUMMARY OF THE PRESENT INVENTION

The present invention relates generally to an apparatus for transferring slices of material in succession between two locations, and, more particularly, to an apparatus for transferring an individual food product slice cut from a supply source to a food product support member such as a backing board or continuous web, without damaging the slice and depositing the same on the support member at a predetermined location.

Various devices are known in the meat production field for the transfer of food material slices, such as bacon slices, onto a support for conveyance to a packaging station. In some of these devices, the transfer of individual, successive slices as they travel from the bacon supply to receiving locations such as a take-off conveyor, a continuous sheet of backing paper or a package backing board is accomplished by way of a mechanical pin or lug which engages or catches successive slices after the slicing knife flings them through the air space separating the material supply and the slice support member.

This method has certain drawbacks, one of which is that the operating speed of the mechanical member is limited because the slice encounters air resistance as it is thrown through the air. The travel of the slice through the air and resultant of placement thereof becomes random, rather than ordered. Additionally, the texture of the product and the temperature of the product after slicing may effect the speed of operation of the transfer apparatus. Exact placement of the product slice onto a support member consequently is not always ensured with a mechanical transfer system of this type because of air resistance and the low mass of the product slice. The operating speed of the entire production line is limited by the maximum operating speed of the transfer member.

Quick transfer of the material slices and exact placement thereof on a support web without altering the size and shape of the slices is desirable to allow the slicing and packaging components of the production line to operate at the most efficient speeds possible. Accurate registration of the individual material slices on the support member is additionally desirable to ensure that the support member is properly loaded. Some attempts at providing material slice transfer mechanisms have utilized rotating drums or cylinders having a vacuum drawn through air passages on the outer surface of the drums to hold material slices in place thereon during the transfer operation. Such mechanisms are described in U.S. Pat. No. 3,978,642, U.S. Pat. No. 4,020,614 and U.S. Pat. No. 4,041,676. Such a mechanism is also described in a related application, Ser. No. 548,171, filed Jul. 5, 1990 now U.S. Pat. No. 5,051,268.

The present invention provides highly efficient and accurate slice registration and, when incorporated into an overall slicing and packaging production line, it can facilitate high-speed transfer of the material slices to a transfer mechanism, thereby enabling the transfer and packaging components to operate at higher speeds commensurate with the component speeds. The present invention sequentially captures individual slices before the slice is completely severed from a supply source onto a substantially flat rotating surface at high speeds matching those of the slicing component without disrupting the slice by stretching or distorting the same. In doing so, the present invention reduces the variables such as meat temperature, slice thickness and meat texture which can commonly affect the meat slicing speed.

In accordance with the present invention, material slices which are sequentially severed from a material supply are transferred by a rotating drum to a support member which can include a take-off conveyor, a continuous support web, or a plurality of sequential individual package support members. The rotating drum is located near to the slicer so that the leading edge of the partially severed slice is forced toward the drum by the slicer and attracted to the drum pneumatically, by way of negative air pressure. This negative air pressure adheres the slice to the outer surface of the drum during the rotation of the drum between the slicing and the desired transfer or deposit locations. When the drum reaches the transfer location, positive air pressure is applied to the slice while the negative air pressure is blocked such that the slice is urged off of the drum onto the adjoining support member. The rotation of the drum can be advantageously synchronized with the cutting action of the slicer to obtain a predetermined spacing between successive material slices. The negative air pressure which adheres individual slices to the rotating drum eliminates the need for a purely mechanical transfer member, while the use of a rotating drum reduces the distance which the slice must travel unrestrained between the slicer and the support member to a minimum.

Accordingly, it is a general object of the present invention to provide an improved apparatus for transferring material slices from a slicing station to support web.

Another object of the present invention is to provide an improved rotating drum for use in a transfer apparatus whereby individual, successive material slices are transferred from a slicing station onto a rotating drum and further onto a support member.

Another object of the present invention is to provide an improved apparatus for depositing material slices on a rotatable support surface which includes a rotating drum operating in conjunction with an inner stationary inner drum, wherein the rotating drum attracts and receives the slice on its outer surface by way of negative air pressure and wherein the outer drum deposits the slice on a support member by way of positive pneumatic pressure supplied to the rotating outer drum by the inner drum.

It is yet a further object of the present invention to provide a transfer apparatus having two operatively associated cylindrical drum members, the first of which being a rotating drum and the second of which being a non-rotating drum, the first drum rotating coaxially around the second, inner non-rotating drum, the inner drum having a first internal pneumatic chamber operatively associated therewith for conveying negative air pressure to the outer surface of the first rotating drum to adhere material slices thereon and a second internal pneumatic chamber operatively associated therewith for conveying positive air pressure to the outer surface of the first drum to urge the material slices off of the first drum, the second drum having a plurality of distinct of first and second passages which respectively communicate air pressure from the first and second pneumatic chambers to the first drum outer surface.

Yet a further object of the present invention is to provide a transfer apparatus having two operatively associated members coaxially aligned, the outer member being capable of rotational movement around the inner member and the inner member being capable of reciprocating movement within the outer member, the outer member having at least one material slice receiving portion thereon which holds material slices in place by negative air pressure.

Another object of the present invention is to provide a transfer apparatus having two rotary drums which adhere material slices to the outer surfaces thereof by negative air pressure.

These and other features and objects of the present invention will become more apparent from a reading of the following detailed description.

BRIEF DESCRIPTION OF THE DRAWINGS

In the course of this description, reference will be made to the attached drawings, wherein.

DETAILED DESCRIPTION OF THE PREFERRED EMBODIMENTS

Figure 2:
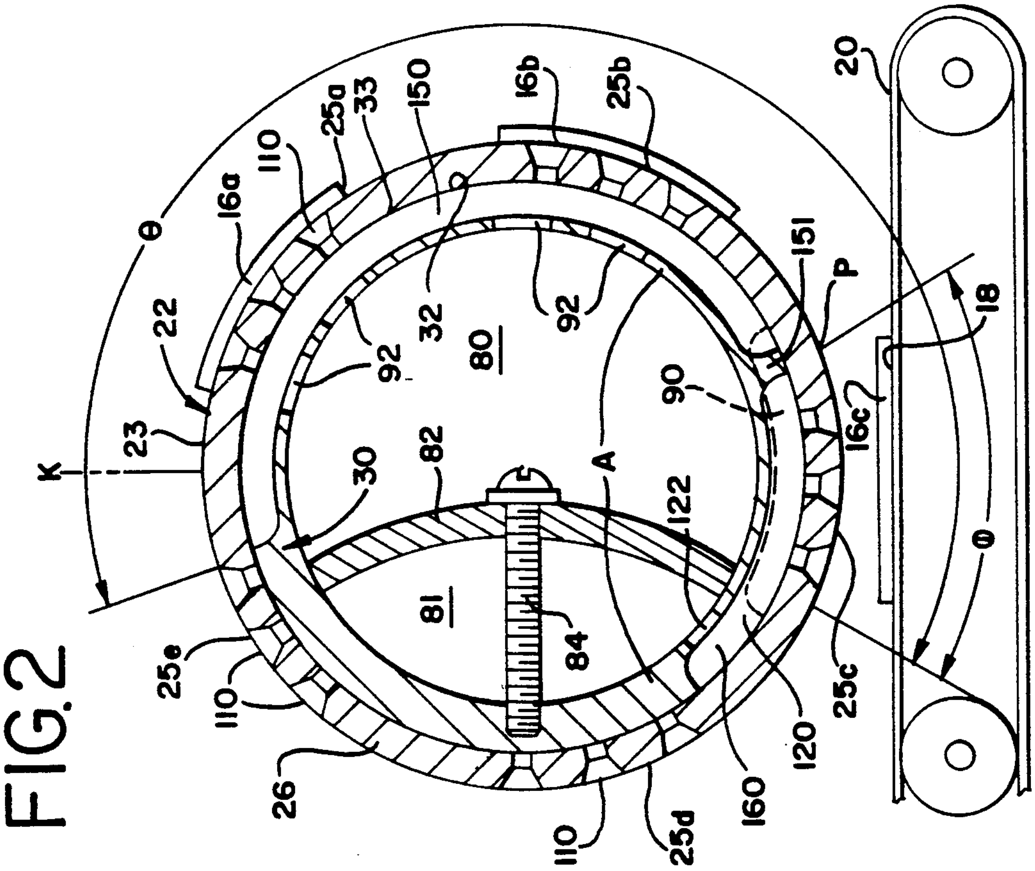
FIG. 2 is a sectional view of the rotary cylinder mechanism of the material transfer apparatus of FIG. 1.

FIGS. 1–4 illustrate an embodiment of a material transfer apparatus 10 constructed in accordance with the principles of the invention in place within the slicing segment of a production line in which material slices are packaged. Although the improved apparatus and methods which are described in the detailed description which follows will be particularly described in the context of the slicing and transfer of bacon slices, it will be appreciated that the present invention will bring substantially equal advantages to the slicing and transfer of other perishable meat food products which food products may have shapes which are different than bacon slices.

The transfer apparatus 10 itself is preferably located adjacent the slicing station 8 in which a supply of food material to be sliced, shown as a belly of bacon 12, is moved into a fixed cutting zone comprising either a disc or continuous band slicing knife or blade 14. In the environment shown, the transfer apparatus 10 is shown used in conjunction with a slicing mechanism having a slicing knife 14 with a generally fixed location and wherein the bacon supply 12 is held in an actuating mechanism 7 so that the bacon supply 12 is moved back and forth in a pendulum-like or simple harmonic motion in the direction shown.

Figure 5:
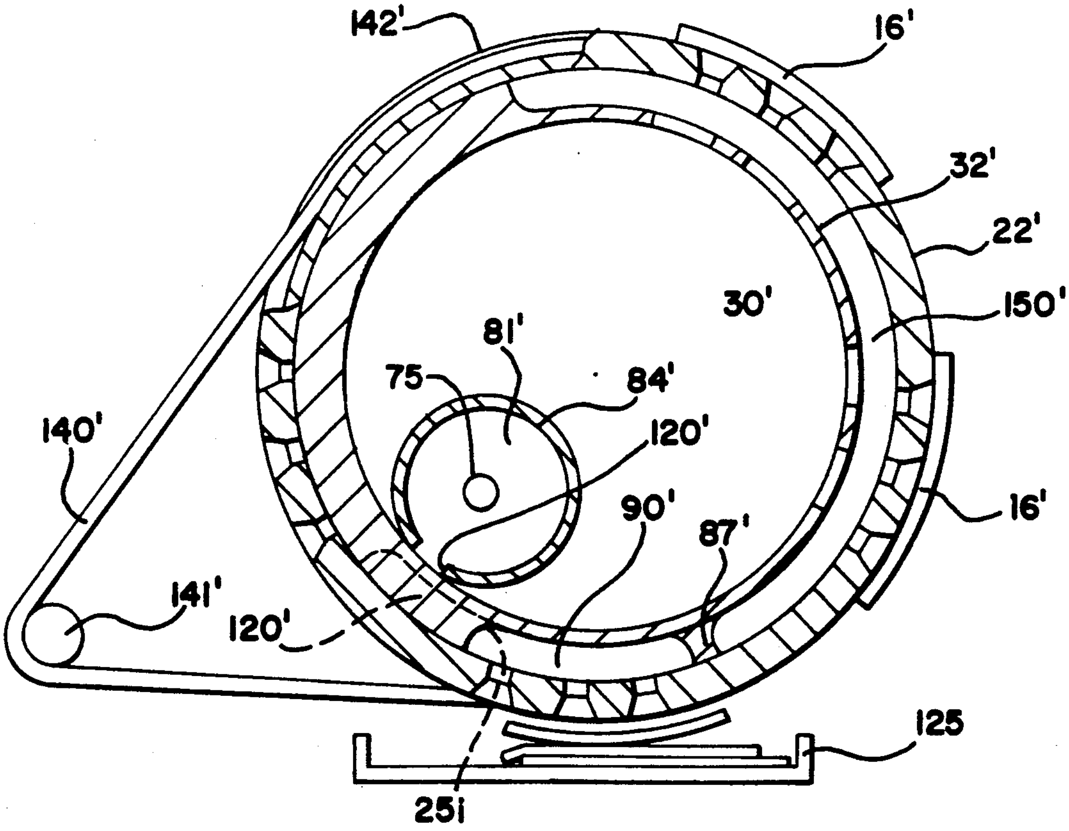
FIG. 5 is a sectional view showing an alternate embodiment of the material transfer apparatus.

Individual bacon slices 16 are shown as being deposited onto a predesignated deposit location 18 on a support member such as a moving take-off conveyor 20 located proximate to the transfer apparatus 10. In certain operations, it may be advantageous and desirable to transfer the bacon slices 16 after being sliced from the bacon supply 12 directly to a continuous length of a substrate or support web (not shown) or it may be used to transfer individual slices in succession to separate backing members or boards 125 (FIG. 5). In most applications, a forming station (not shown) for assembling a predetermined amount of bacon slices into any format suitable for packaging may also be provided further downstream of the transfer apparatus 10.

Figure 1:
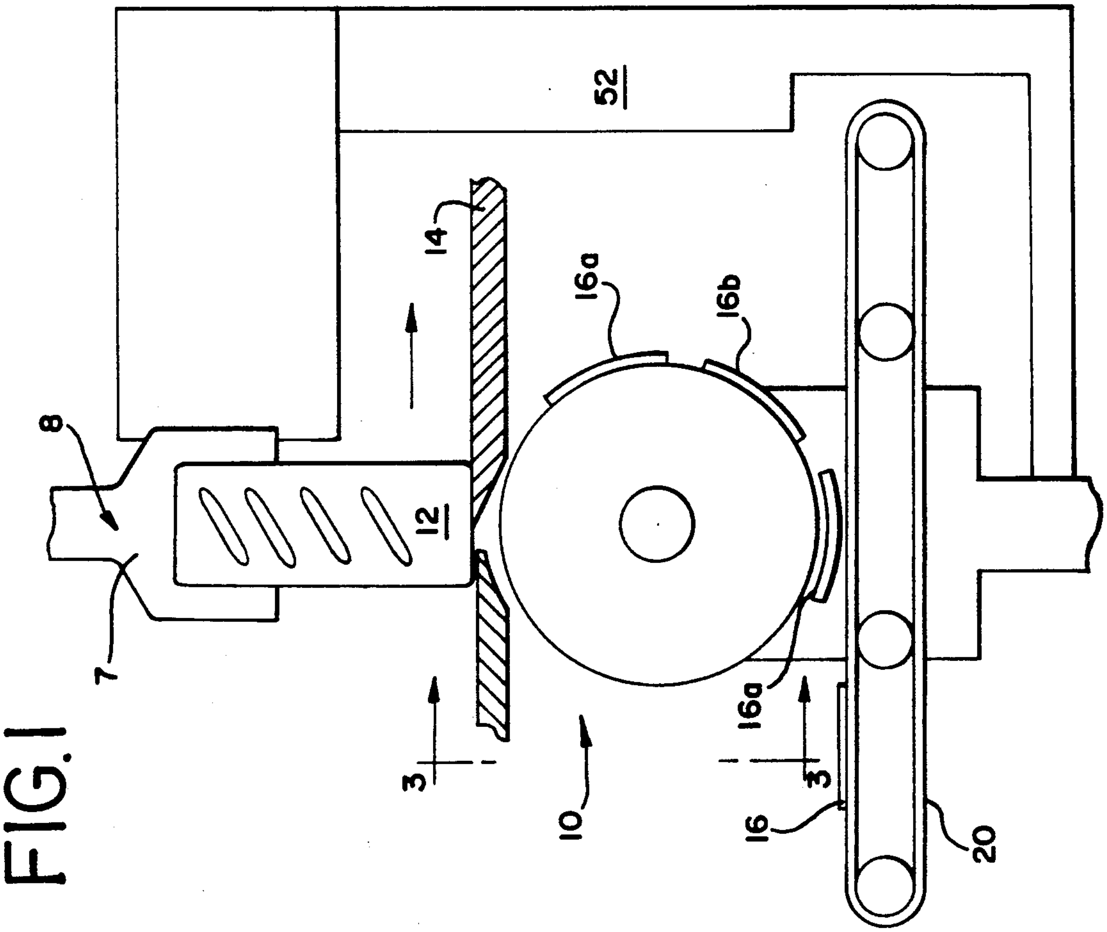
FIG. 1 is an elevational view of one embodiment of a material transfer apparatus constructed in accordance with the principles of the present invention.

Turning now to the particular details of the transfer apparatus 10, the transfer apparatus 10 includes a rotating transfer means in the form of an outer rotating cylinder or drum 22 disposed generally adjacent to and beneath the slicing knife 14. With more particular reference to FIG. 2, the outer drum 22 is mounted on a frame 24 in conjunction with non-rotating inner drum 30 to form a transfer assembly which is mounted transversely underneath the slicing knife 14. The outer drum 22 freely rotates in a clockwise direction, as shown in FIG. 1 and is rotatably mounted at what will be described as the inboard end 54 of the frame 24. The outer drum 22 has an outwardly extending hub portion or spindle 27 which is secured to the drum by way of attachment pins 50 and bolt 55. The spindle 27 terminates at one end thereof in a shaft 28 which is rotatably held in place by a pair of bearings 29 in the frame 24, and which is further connected to a drive means 51. The outer drum 22 includes a hollow, cylindrical shell member 26 having a substantially flat outer cylindrical surface 23. A bolt 55 which is seated against a heavy member or washer 56 extends partially into the interior of the first drum 22. The bolt 55 threadedly engages an inner bore 57 of the spindle so that the washer member 56 abuts against an inner flange 58 of the outer drum 22.

The transfer assembly, and in particular, the outer drum 22, may be driven by any suitable drive mechanism, such as the belt drive 51 shown, or a gear drive. The belt drive means 51 is operatively connected to the outer drum 22 and is also preferably operatively connected to the slicing mechanism 8. Importantly, the belt drive 51 is further operatively connected to the inner drum 30 in a manner so that both the rotation of the outer drum 22 and the oscillation of inner drum 30 is synchronized with the movement of the slicing station 8, including the bacon supply 12. In this regard, a suitable control or indexing means 52 is provided to control the timing and velocity profile of the outer drum 22 so that it corresponds to that of the advancing stroke of the meat supply source. Preferably, the indexing means 52 is programmed so that when the material supply is in its cutting stroke or motion (toward the right in FIG. 1.), the outer drum 22 is rotating at a speed which substantially matches the speed of the slicing mechanism. When the material supply is in its return stroke (toward the left FIG. 1), the outer drum 22 may be either stationary or rotating at a speed which is substantially equal to the speed of the take-off conveyor 20. Although FIG. 1 depicts movement of this conveyor from right to left, it will be understood that the conveyor 20 may also move in the opposite direction. Thus, movement of the outer drum 22 may be accomplished at a velocity which is substantially the same as the velocity of the material slice 16 during severing.

In an important aspect of the present invention, the inner drum 30 does not rotate with the first drum 22, but is fixed in place against rotation by a guide assembly 53. The inner drum 30 is adapted for oscillating or reciprocating axial movement within the first drum 22. This reciprocating movement allows the inner drum 30 to provide alternating negative and positive air pressure to a portion of the outer drum exterior surface 23. To accomplish this function, the inner drum 30 has a construction generally similar to the outer drum 22 in that it is also a generally cylindrical hollow shell. The outer diameter of the inner drum 30 closely matches the inner diameter of the outer drum 22 and the frame assembly to provide an effective pneumatic seal between the inner and outer drums.

At its inboard end 67, the inner drum outer shell 32 is closed by a cup or hub member 34 which seats against an internal flange or shoulder 35. The cup 34 has a central cavity 36 at its outboard end which is larger than the first drum bolt head 55 and receives the same during the reciprocal movement of the inner drum 30. As illustrated, the cup member 34 is held in place in the outer shell 32 by a retaining ring 37 which engages a circumferential groove 38 in the inner drum shell 32.

The outboard end 64 of the inner drum 30 is provided with a depending lug 65 which slidably engages a groove 66 in the guide assembly 53. The groove 66 controls the inner drum 30 during its reciprocating movement within the outer drum 22. The reciprocating movement of the inner drum 30 is effected by a yoke 70 disposed near the outboard end 64 of the inner drum 22 which engages a circumferential groove 71 in the inner drum outer surface 32. The yoke 70 is operatively connected to a connecting rod 72 which is mechanically actuated during operation of the transfer assembly to move the inner drum 30 reciprocatingly along a longitudinal axis within the outer drum 22.

The pneumatic characteristics of the inner drum 30 are preferably provided by two distinct pneumatic passages or plenums 80, 81 which extend substantially for the entire length of the stationary inner drum 30. These plenums 80, 81 may be separated by a plenum wall or barrier 82 (FIG. 2), which also extends for substantially the entire length of the inner drum 30. The plenum wall 82 may be welded to the interior surface of the second drum shell 32 or it may be attached by any suitable means such as one or more bolts 84. Alternatively, as shown in FIG. 5, the second pneumatic plenum 81' may be defined by a length of a manifold pipe 84' which extends axially through the inner drum 30, and contacts the inner surface thereof. In such instances, the manifold pipe 84' is provided with a plurality of air apertures 122' which open through the inner drum 30'. As shown in the embodiment of FIG. 3, a positive, air pressure inlet 60 may be provided at the outboard end of the inner drum 30. This inlet may feed positive air pressure to a pair of air seals 61 in the inner drum outer shell 32 and to the second plenum 81. An air pressure passage 62 disposed in the transfer apparatus frame 24 communicates air from inlet 60 to plenum 81 through port 63. In the FIG. 5 embodiment, the air pressure inlet 60 and pressure passage 62 may be eliminated and positive air pressure introduced therein by way of an extension of manifold pipe 84' which is flexibly connected to air inlet conduit 75.

The outboard end 64 of the inner drum 30 is open and communicates with a vacuum pipe or conduit 175 which is connected to a source of negative air pressure and supplies a vacuum to the plenum 80, or the interior of the second drum 30 to provide a vacuum or suction force which holds the sequentially sliced food material, such as bacon slices 16, onto the outer surface 23 of the outer drum 22. A second air conduit or pipe may be provided in communication with pressure air inlet 60 and thus with the interior of the stationary inner drum 30 and, in particular to the second plenum 81 to provide a means for supplying positive air pressure to the inner drum second plenum 81 and to the outer drum 22 in the area where the food slices 16 are transferred from the outer drum surface 23 to a support member.

The first plenum 80 communicates with a large portion of the inner drum 30, and defines a first operational arc length, $\theta$, of the transfer apparatus 10 which corresponds to a distinct zone on the outer drum 22 wherein negative air pressure is applied to the slices 16 carried on this outer drum portion. The second plenum 81 communicates with a smaller portion on the inner drum 30 and at least part of which defines a second operational arc length, $\phi$ of the transfer apparatus 10 which corresponds to a second distinct zone where positive air pressure is applied to the slices 16 held on the outer drum 22 when they reach this zone. As will be explained below, portions of these two air pressure zones may overlap or extend past each other. In most instances, the second arc length $\phi$ will be less than $\theta$. The first arc length $\theta$ will generally extend between the point where the slicing knife 14 deposits a slice *16a* on the corresponding outer drum slice receiving portion *25a* and the second pressure zone which is proximate to the plenum wall 82 which separates the first and second plenums.

The air apertures 110 of the rotating drum outer surface 23 are preferably arranged in a preselected pattern which is chosen to accommodate certain variables such as, the width of material to be sliced and the desired spacing between successive material slices. Preferably, the pattern of the air apertures 110 in each discrete material slice receiving portions *25a–25e* is generally rectangular in nature, however any configuration will suffice provided that the length and width of each of the discrete material receiving portions provide an area sufficient to adhere the material slice 16 to the rotating drum 22. In this regard, a circular pattern of apertures may be desirable to use for round food material slices, such as bologna.

As will be noted below, the air apertures 110 are aligned on the outer drum 22 so that they will communicate with a series of pressure grooves 120 and suction grooves 90 recessed in the inner drum 30 when the inner drum 30 is moved between first and second operative positions. The first drum air apertures 110 are arranged sequentially on the outer drum 22 and define a plurality of discrete material slice receiving portions *25a*, *25b*, *25c*, *25d* and *25e* circumferentially spaced along the outer face 23 of the rotating drum 22. Although five discrete material receiving portions *25a–e* are illustrated as an arrangement which is preferable for this embodiment, it will be noted that the number of such portions is not limited and may include either one or multiple portions greater or less than five. Preferably, an odd number of discrete material slice receiving portions will be provided.

Figure 3:
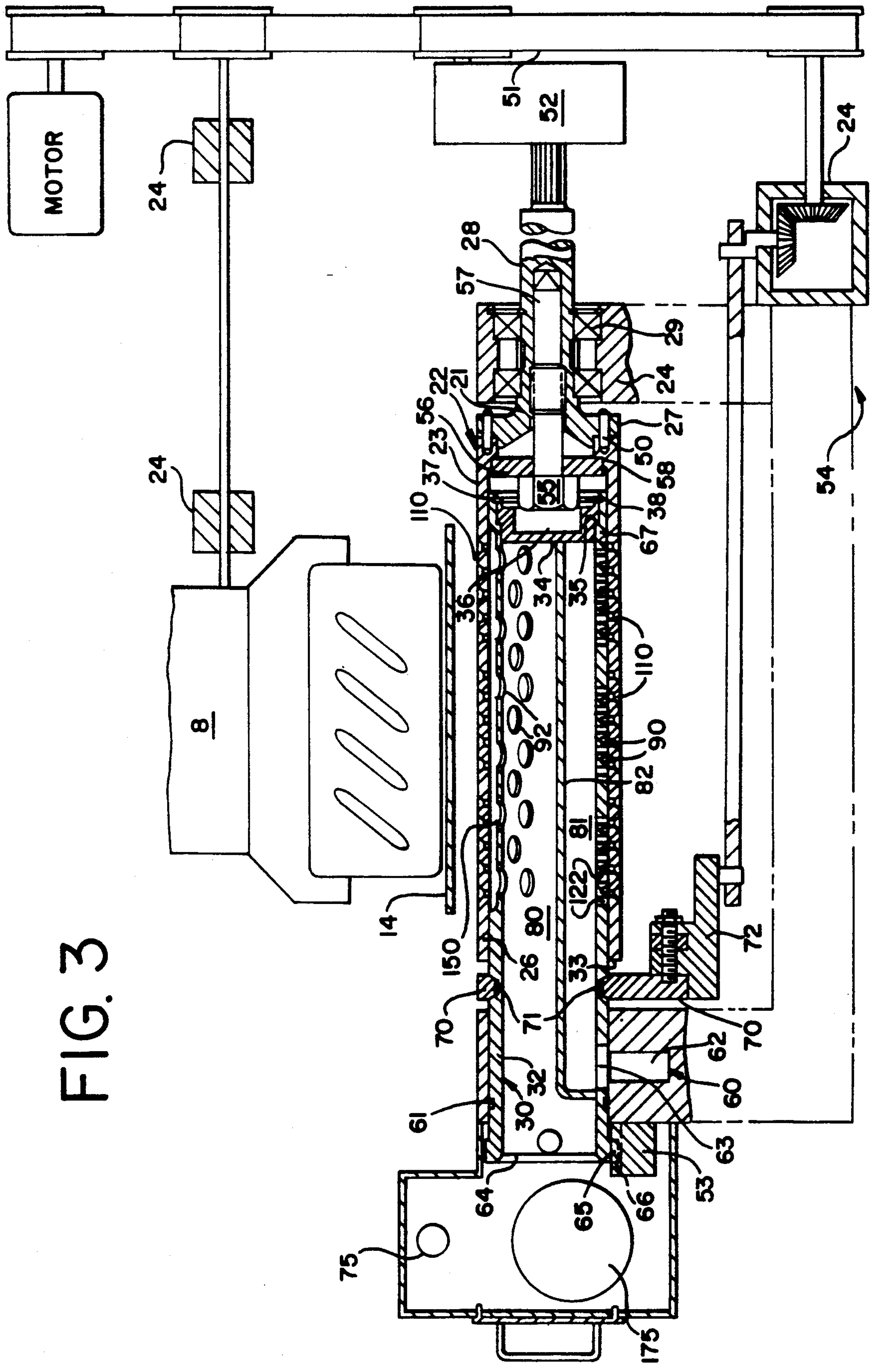
FIG. 3 is a plan sectional view taken along line 3—3 of FIG. 1.
Figure 4:
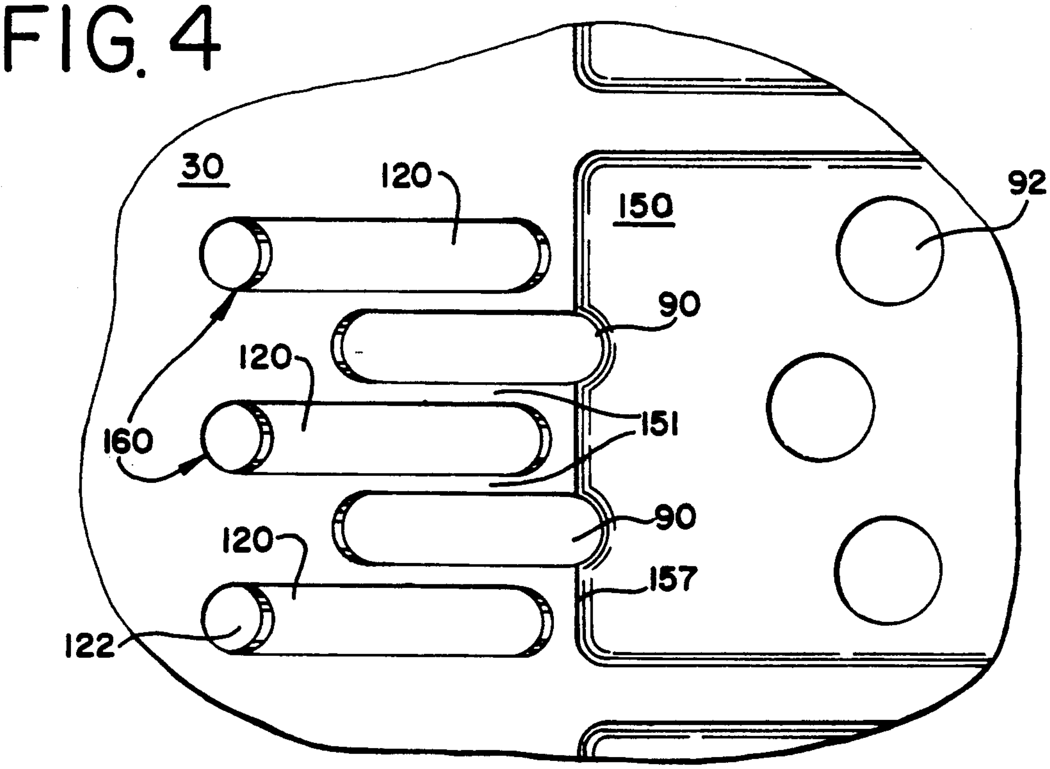
FIG. 4 is a detailed view of a portion of the surface of the inner cylinder of the material transfer apparatus of FIG. 1 indicated at "A" in FIG. 2.
Figure 6:
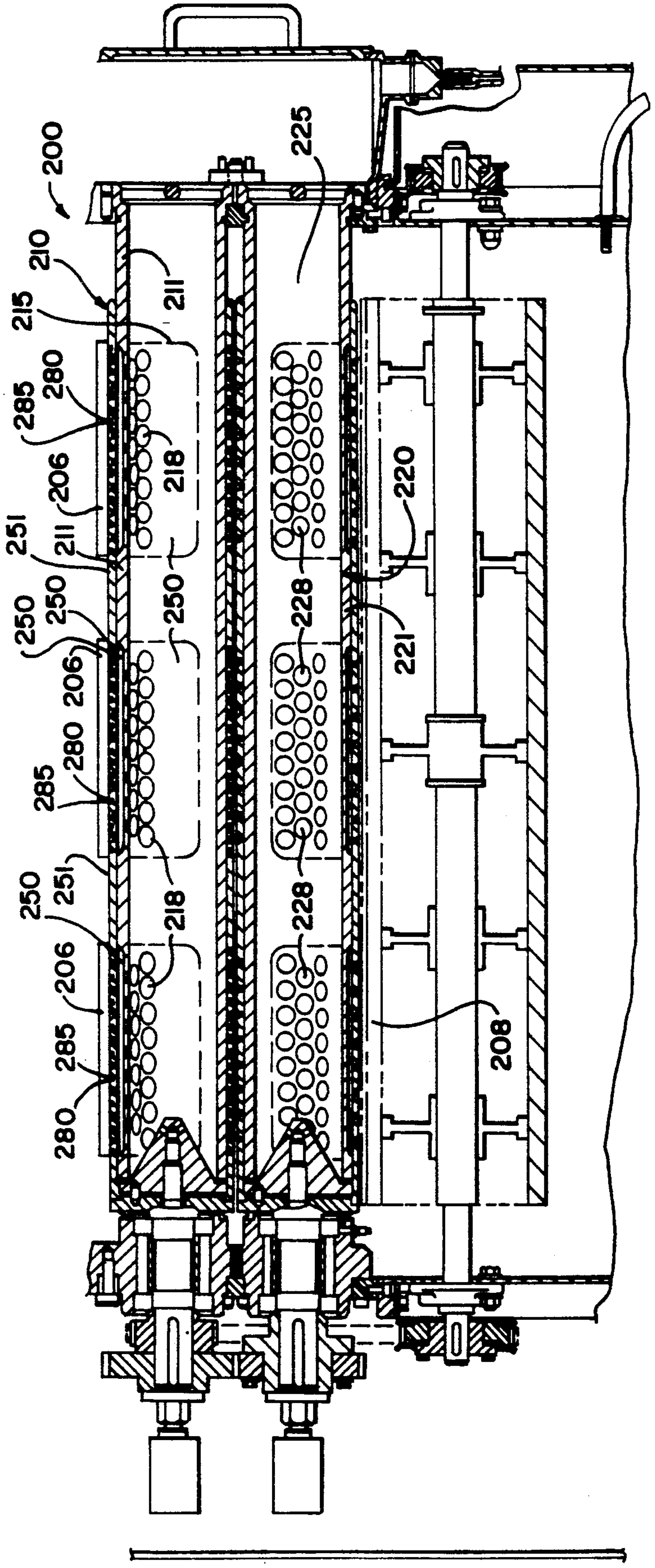
FIG. 6 is a sectional view of another embodiment of a material transfer apparatus constructed in accordance with the principles of the present invention and utilizing two rotary mechanisms.

Turning now to the details of the inner, non-rotating drum 30 and, in particular, of the pneumatic characteristics thereof, means for communicating the vacuum in the first plenum 80 to the outer drum air apertures 110 is provided in the outer surface 32 of the inner drum 30. As shown in FIGS. 3 and 4, this may include a recessed area 150 which extends beneath the inner drum outer surface 32. The recessed area 150 may be configured so that it extends for substantially the entire length of the inner drum 30 where slices are being sliced from only one food material supply, and it extends thus for substantially the entire length of the slice. Alternatively, where multiple slices are being severed from multiple meat supply sources, such as illustrated in the embodiment of FIG. 6, the recessed areas 250 can be subdivided by intervening lands 251.

The recessed area 150 includes a trailing edge 157 which is preferably positioned on the inner drum 30 slightly ahead the slice support member 18 (as viewed in the cross-sectional views of FIGS. 2 and 5 when proceeding in a clockwise direction around the drum). A plurality of elongated, spaced-apart recessed grooves 90 are formed in the inner drum outer surface 32 and extend from the trailing edge 157 for a predetermined circumferential extent (FIG. 4) and thereby provide an extension of the recessed area 150. Negative air pressure is communicated to these first grooves 90 by way of one or more openings 92 in the inner drum 30 which are disposed in the recessed area 150 and which pneumatically communicate with the first plenum 80. The area of the inner drum 30 behind of the recessed area trailing edge 157 in which the grooves 90 are disposed defines the slice ejection or removal area, which corresponds to the second arc length $\phi$.

Figure 4A:
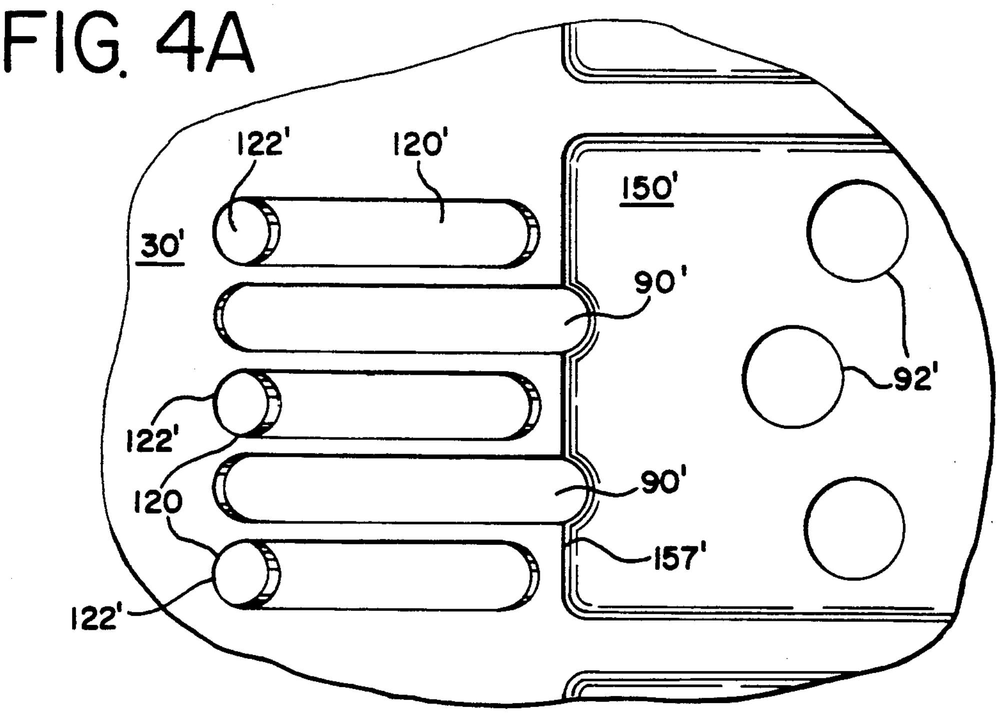
FIG. 4A is a detailed view of a portion of the surface of the inner cylinder of a another embodiment of a material transfer apparatus constructed in accordance with the principles of the present invention.

A second set of pressure grooves 120 are disposed in the inner drum outer surface in the areas which separate adjoining first grooves 90. These second grooves 120 also extend circumferentially around the inner drum 30 for a predetermined distance equal to approximately the entire second operational arc length $\phi$ to define a positive air pressure zone. The second grooves 120 may extend past the first grooves 90 as shown in FIGS. 2 and 4 or the second grooves 120' may be arranged such that they are generally aligned with the first grooves 90' as shown in FIG. 4A. The second grooves 120 each include openings 122 which communicate with the inner drum second plenum 81. When any of the air apertures 110 of the material slice receiving portions **25*a–e* of the outer drum pass over the second set of grooves 120 and positive air pressure is supplied by the second plenum 81, the material slices 16 are urged off of the outer drum 22 and onto the support member 20**.

Figure 7A:
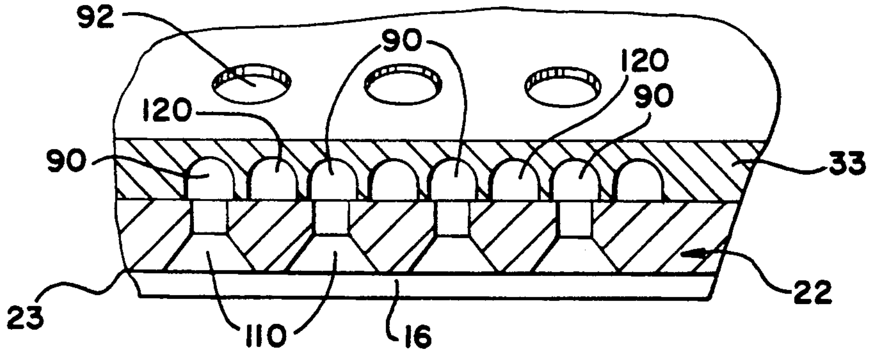
FIG. 7A is a cross-sectional view of the outer and inner drums taken through the ejection zone of the transfer apparatus while the material slice is adhered to the material slice receiving portion.
Figure 7B:
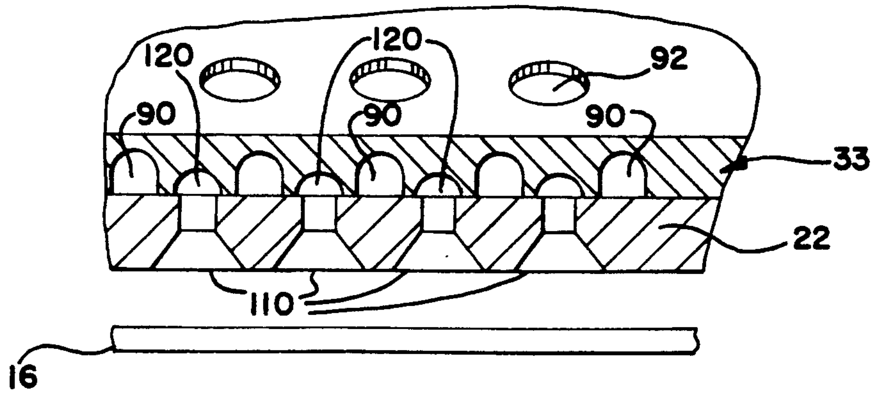
FIG. 7B is a cross-sectional view of the outer and inner drums taken through the ejection zone of the transfer apparatus after the inner drum has been moved within the outer drums to its second operational position wherein the slice has been ejected.

The second or pressure grooves 120, extend partially over both the first and second plenum passages 80 and 81. An opening 122 is associated with each of these pressure grooves 120 and communicates with the second plenum 81. Preferably, as shown in the detailed view of FIG. 4, the first and second grooves 90, 120 are arranged in an alternating fashion proximate to the plenum barrier 82. When the transfer apparatus 10 is conveying the material slice 16 from the slicing knife 14 to the support member 18, the first grooves 90 are aligned with the air apertures as shown in FIG. 7A. After the slice 16 enters the ejecting zone or second arc length $\phi$, the pressure grooves 120 are brought into pneumatic communication with the outer drum air apertures 110 when the inner member 30 is driven in its reciprocating along the central axis of the transfer assembly 10. (FIG. 7B) The pressure grooves 120 are thus able to apply a generally uniform positive air pressure instantly against the entire length of the material slice 16 to ensure an almost instantaneous removal of the entire material slice 16. The material slice 16 is thus removed from the outer drum 22 without substantially distorting the same. The application of positive air pressure uniformly on the entire length of the slice 16 provides an ejection force which is substantially normal to the slice to thereby ensure that the slices are uniformly deposited on the support member 20 without disruption.

Apart from the positive air pressure supplied through the pressure grooves 120, an additional means for urging the slices off of the first drum 22, may be provided which, as illustrated in FIGS. 5 and 6, includes one or more belts 140', which encircle the outer drum 22', within a series of separate, axially-spaced channels 142', or other means suitable for maintaining the illustrated placement of the belts 140'. The belts may engage a tensioning assembly 141' which provides tension to the belts and are preferably positioned apart from the outer drum 22' so that they operatively intersect and engage successive individual material slices 16' proximate to the leading edge 87' of the suction grooves 90' which extend from and communicate with the recessed area 150'. The belts 140' also serve to remove the material slices 16' in the event of failure of the pneumatic system supplying positive air pressure to the outer drum 22'.

As mentioned above, FIG. 6 shows an alternate embodiment of a transfer apparatus 200 which is particularly suitable for accommodating the simultaneous transfer of multiple food slices in which two rotating cylinders 210, 220 are mounted in conjunction with two reciprocating inner cylinders 211, 221. In this embodiment, both inner cylinders 211, 221 have a construction generally the same as the inner drum 30 described in detail above such as the first pneumatic plenums 215, and 225, and the recessed grooves 218 and 228 the second pneumatic plenums and the second set of grooves not being shown in FIG. 6 for purposes of clarity. In this particular embodiment, the outer cylinders 210, 220 are positioned in vertical alignment so that material slices 206 which are severed from the multiple material supplies (not shown) are adhered to the outer surface of the first outer cylinder 210 and transferred by positive air pressure to the second outer cylinder 220 where in turn it is transferred to a support member 208. One, or both of the rotating cylinders 210, 220 has a series of elastic bands 280 disposed in axially spaced channels 285 to assist in urging the material slices 206 off of the cylinders.

In operation of the present invention, a vacuum is drawn in the first plenum 80 of the inner drum 30. Air is drawn through the outer drum air apertures 110 into the recessed area, and further into the first plenum 80. When the material supply 12 is moved in its harmonic or pendulum-like motion, the material supply 12 contacts the slicing knife 14 and a material slice 16 is severed therefrom. During the slicing movement of the slicing mechanism, the outer drum 22 is rotated at substantially the same velocity as the material supply 12 so that a discrete material slice receiving portion **25*a* is indexed beneath the slicer to capture the material slice 16***a* so sliced.

Because these two components move at the same speeds, the slice 16 is captured onto the material receiving portions 25*a–e* without damage thereto, such as by tearing or stretching. The vacuum generated in the plenum 80 holds any slice in place until the next successive material slice receiving portion 25*e* is presented opposite the slicer 14. While the material slice 16*c* is held on the outer drum 22, the indexing drive means 52 rotates the outer drum 22 in an intermittent rotational movement until the slice 16*c* is positioned opposite the support member 20. At this point, the rotation of the outer drum 22 stops and the material slice 16*c* is subsequently urged off its material slice receiving portion 25*c* by positive air pressure generated by the second pneumatic means which contacts the back surface of the slice. This is effected when the inner drum 30 is moved longitudinally within the outer member 22 so that the second or pressure grooves 120 are moved sideways into alignment with the outer drum air apertures 110. When aligned, the positive air pressure passing through the grooves 120 urges the material slice 16*c* off of the outer drum 22 onto a suitable support member 20.

It will be seen that while certain embodiments of the present invention have been shown and described, it will be obvious to those skilled in the art that changes and modifications may be made therein without departing from the true spirit and scope of the inventions.

I claim:

1. A transfer apparatus for transferring successive slices of material severed from a food material supply by a slicing means to a support member, comprising:

a rotating member having a generally cylindrical outer surface, the rotating member outer surface having at least one discrete material slice receiving portion thereon which is adapted to receive a material slice severed from said material supply, said transfer apparatus further including a non-rotating cylindrical member disposed interior of said rotating member, said non-rotating member having a first and second plenum extending therethrough, said first plenum having first pneumatic means operatively connected thereto, said first plenum pneumatically communicating with said discrete material slice receiving portion when said non-rotating member is in a first operative position such that the first pneumatic means supplies negative air pressure to said discrete material slice receiving portion, said second plenum having second pneumatic means operatively connected thereto, said second plenum pneumatically communicating with said discrete material slice receiving portion when said non-rotating member is in a second operative position such that said second plenum supplies positive air pressure to said discrete material slice receiving portion, said non-rotating member being adapted to move longitudinally within said rotating member between the non-rotating member first and second operative positions, said non-rotating member having first and second groove means disposed in the outer surface thereof, the first and second groove means extending respective first and second preselected circumferential distances along the non-rotating member outer surface, said first groove means being in pneumatic communication with said first plenum to provide negative air pressure to said discrete material slice receiving portion when said non-rotating member is in said first operative position and said second groove means being in pneumatic communication with said second plenum to provide positive air pressure to said discrete material slice receiving portion when said non-rotating member is in said second operative position to urge said material slice off of said discrete material slice receiving portion.

2. The transfer apparatus of claim 1, wherein said rotating member includes a plurality of air apertures extending through the outer surface thereof and in operative communication with said non-rotating member first plenum passage, the air apertures defining said discrete material slice receiving portion on said rotating member outer surface.

3. The transfer apparatus of claim 1, wherein said rotating member includes an odd number of discrete material slice receiving portions.

4. The transfer apparatus of claim 1, wherein said non-rotating member first and second plenums are separated by a barrier member extending along an interior longitudinal length of said non-rotating member.

5. The transfer apparatus of claim 1, further including means for reciprocatingly moving said non-rotating member longitudinally within said rotating member.

6. The transfer apparatus of claim 5, wherein said reciprocating means includes a yoke engaging a portion of said non-rotating member outer surface and guide means for guiding said non-rotating member in movement reciprocating within said rotating member.

7. The transfer apparatus of claim 1, wherein said rotating member is mounted on a frame assembly, said rotating member being rotatably driven by drive means disposed at one end of said frame assembly, and said non-rotating member is mounted on said frame assembly and is further adapted for reciprocating movement within said rotating member, said non-rotating member being driven in said reciprocating movement by drive means disposed proximate to the opposite end of said frame assembly.

8. The transfer apparatus of claim 1, wherein said rotating member includes a rotatable hollow drum and said non-rotating member includes a hollow drum.

9. The transfer apparatus of claim 1, wherein said rotating member is operatively connected to the slicing means by drive means whereby movement of said slicing means causes a corresponding operative rotation of said rotating member such that said discrete material slice receiving portion is proximate to said material supply during slicing of a material slice therefrom.

10. The transfer apparatus of claim 1, wherein said slicing means includes a material supply which is brought into contact with a slicing blade, said material supply being driven by a drive means in a generally harmonic motion, said rotating member including drive means for rotating said rotating member around said non-rotating member, said rotating member drive means being operatively connected to said slicing means drive means whereby the movement of said rotating member discrete material receiving portion is indexed to movement of said slicing means material supply into contact with said slicing blade.

11. The transfer apparatus of claim 10, wherein said rotating member is driven at substantially the same speed of said slicing means.

12. The transfer apparatus of claim 1, wherein a portion of said first groove means are spaced apart in a side-by-side fashion on the outer surface of said non-rotating member and said second groove means are disposed within the spaces separating said first groove means portion.

13. The transfer apparatus of claim 1, wherein said first and second groove means are disposed in an alternating fashion on said non-rotating member.

14. The transfer apparatus of claim 1, wherein said first groove means includes a recessed area, said first groove means extending circumferentially outwardly from the recessed area on said non-rotating member outer surface to define extension grooves of said recessed area, said second groove means and the extension grooves having approximately the same length, said second groove means and said extension grooves being disposed on said non-rotating member in an alternating fashion.

15. The transfer apparatus of claim 14, wherein said first grooves means define a suction zone of said non-rotating member which is larger than a pressure zone defined by said second groove means.

16. The transfer apparatus of claim 1, wherein said support member is a conveyor.

17. The transfer apparatus of claim 1, wherein said support member is a continuous web, the continuous web being driven in unison with said rotating member.

18. The transfer apparatus of claim 1, wherein said support member is a product backing member.

19. The transfer apparatus of claim 1, further including means for blocking said negative air pressure in communication with said at least one discrete material slice receiving portion.

20. The transfer apparatus of claim 1 further including band means for urging successive material slices off of said rotating member onto said support member.

21. The transfer apparatus of claim 20, wherein a portion of said band means engages said successive material slices on said rotating member at said at least one discrete material slice receiving portion.

22. A mechanism for transferring successive food material slices cut by a slicing knife from a food material supply to a predesignated deposit location, the mechanism comprising:

rotating means having a generally cylindrical outer surface, said rotating means having a plurality of air apertures extending through the outer surface thereof and defining at least one material slice receiving portion on said rotating means outer surface, an inner core member being supported at least partially within said rotating means and being adapted for longitudinal reciprocating movement within said rotating means, the inner core member having interior first and second plenum means communicating with said rotating means by way of respective first and second openings in said inner core member, said first and second openings defining distinct first and second pneumatic zones on said inner core member, said first openings communicating with said rotating means to supply negative air pressure thereto when said inner core member is in a first operative position, said second openings communicating with said rotating means is in a second operative position to supply positive air pressure thereto, said inner core member being driven between said first and second operative positions by reciprocating drive means.

23. The mechanism of claim 22, wherein said rotating means includes a rotating cylinder having a plurality of discrete material slice engaging areas disposed on its outer surface, and said inner core first plenum means includes first pneumatic supply means associated therewith for supplying negative air pressure thereto and said second inner core pneumatic plenum means includes second pneumatic means associated therewith for supplying positive air pressure thereto.

24. The mechanism of claim 22, wherein said inner core member includes means for blocking the communication of said first plenum means to said rotating means when said inner core is in its second operative position.

25. The mechanism of claim 22, wherein said air apertures are arranged in an array on an exterior surface of said rotating means, said rotating means including an odd number of air aperture arrays.

26. The mechanism of claim 22, wherein said rotating means is indexed to a material supply drive means which permits said rotating means to rotate at substantially the same speed at which the material supply moves.

27. The mechanism of claim 22, further including an additional rotating means disposed proximate to said rotating means, said rotating means and the additional rotating means being driven in unison by drive means, said additional rotating means also having at least one material slice receiving portion on an outer surface of said additional rotating means.

28. The mechanism of claim 27, wherein said additional rotating means includes an inner core member adapted for reciprocating movement within said additional rotating means between first and second operative positions, said additional rotating means inner core member having first and second plenum means communicating with said additional rotating means and respectively supplying negative and positive air pressure to said additional rotating means.

29. A pneumatic roller assembly for use in a material transfer mechanism for transferring individual, successive food material slices severed from a food material supply to a predesignated deposit location, the pneumatic roller assembly comprising, in combination:

an inner member having a generally cylindrical outer surface and first and second plenums extending along its interior, the inner member having at least two distinct openings which communicate the first and second plenums with the outer surface of said inner member;

an outer roller disposed on said inner member, the outer roller being capable of rotational movement around said inner member, the outer roller having a plurality of air apertures extending through an outer surface of said outer roller;

first pneumatic means operatively associated with said inner member first plenum for supplying negative air pressure to said first plenum;

second pneumatic means operatively associated with said inner member second plenum for supplying positive air pressure to said second plenum;

said inner member having a plurality of first and second openings on said outer surface thereof, the inner member first and second openings being respectively associated with said first and second plenums, whereby negative air pressure is conveyed to said outer roller air apertures during rotation of said outer roller around a first predesignated arc length of said inner member while said inner member is in a first operational position and whereby positive air pressure is conveyed to said outer roller air apertures at a second predesignated arc length of said inner member while said inner member is in a second operational position to transfer successive food material slices off of said outer roller onto a support member.

30. The pneumatic roller assembly of claim 29, wherein said inner member is adapted for reciprocating movement within said outer roller between the first and second operational positions of said inner member, said inner member first plenum being in pneumatic alignment with said outer roller air apertures when said inner member is in said first operational position and said inner member second plenum being in pneumatic alignment with said outer roller air apertures when said inner member is in said second operational position.

31. The pneumatic roller assembly of claim 30, wherein said outer roller includes band means encircling said outer roller at predesignated intervals.

32. A method of transferring slices of food material, comprising the steps of:

providing a rotating member having a non-rotating, inner member;

rotating the rotating member so that the outer surface thereof engages an individual food material slice;

applying negative air pressure to a portion of said rotating member outer surface to adhere the individual food material slice to a material slice receiving portion of said rotating member;

rotating said rotating member while said individual food material slice is adhered to said rotating member material slice receiving portion, so that the rotating member material slice receiving portion is disposed proximate to a material slice support member;

moving the non-rotating member within said rotating member and applying positive air pressure to said rotating member individual material slice receiving portion to thereby urge said individual food material slice off of said rotating member outer surface material slice receiving portion and onto said support member.

33. The method of claim 32, wherein said individual food material slice is a slice of bacon.

34. The method of claim 32, wherein said rotating member has a plurality of air apertures therein and said negative air pressure is applied to said rotating member outer surface material slice receiving portion by drawing a vacuum through a first plenum disposed in said non-rotating member and in pneumatic communication with said rotating member air apertures.

35. A mechanism for transferring successive food material slices cut by a slicing knife from a food material supply to a predesignated deposit location, the mechanism comprising:

rotating means having a generally cylindrical outer surface, said rotating means having a plurality of air apertures extending through the outer surface thereof and defining at least one material slice receiving portion on said rotating means outer surface, said rotating means rotating around a non-rotating inner core member and rotating material slices deposited on said material slice receiving portion through a slice retention zone and into a slice ejection zone, the inner core member being supported at least partially within said rotating means and being adapted for longitudinal reciprocating movement within said rotating means, the inner core member having interior first and second plenums communicating with said rotating means by way of respective first and second openings in said inner core member, said first and second openings defining distinct first and second pneumatic zones on said inner core member, said inner core member first pneumatic zone corresponding to said rotating means slice retention zone, said inner core member second pneumatic zone corresponding to said rotating means slice rejection zone, said first openings communicating with said rotating means to supply negative air pressure thereto when said inner core member is in a first operative position to thereby retain material slices in place on said material slice receiving portion, said second openings communicating with said rotating means to supply positive air pressure thereto when said rotating means is in a second operative position to thereby eject material slices from said material slice receiving portion onto said predesignated deposit location, said inner core member being driven between said first and second operative positions by reciprocating drive means.

* * * * *